United States Patent [19]

Hottovy

[11] Patent Number: 5,183,866
[45] Date of Patent: Feb. 2, 1993

[54] POLYMER RECOVERY PROCESS

[75] Inventor: John D. Hottovy, Bartlesville, Okla.

[73] Assignee: Phillips Petroleum Company, Bartlesville, Okla.

[21] Appl. No.: 400,620

[22] Filed: Aug. 30, 1989

[51] Int. Cl.[5] .................................................. C08F 2/14
[52] U.S. Cl. ...................................... 526/88; 526/352; 528/501
[58] Field of Search ........................................ 526/164

[56] References Cited

U.S. PATENT DOCUMENTS

| | | | |
|---|---|---|---|
| 3,195,613 | 7/1965 | Hawkins | 159/47 |
| 4,211,124 | 7/1980 | Ng et al. | 73/345 |
| 4,222,895 | 9/1980 | Allan et al. | 252/429 B |
| 4,424,341 | 1/1984 | Hanson et al. | 528/501 |
| 4,469,560 | 9/1984 | Morgan | 203/2 |

OTHER PUBLICATIONS

Perry's Chemical Engineers Handbook, 6th ed., McGraw-Hill Inc., 1984, pp. 10–47.

Primary Examiner—Joseph L. Schofer
Assistant Examiner—Tom Weber
Attorney, Agent, or Firm—Edward L. Bowman

[57] ABSTRACT

A polymerization process wherein monomers are polymerized in liquid diluent to produce a liquid slurry containing particles of normally solid polymers, periodically opening a product takeoff port to allow a charge of liquid slurry to flow into an elongated confined zone including a flash line heater and then into a flash chamber wherein the lighter components are separated from the polymer. The process is particularly characterized by the fact the elongated confined zone is constructed such that the flow time of the charge of slurry in the flash line heater is equal to at least about 25 percent of the time between the time of the closing of the settling valve and the next opening of the settling valve.

20 Claims, 1 Drawing Sheet

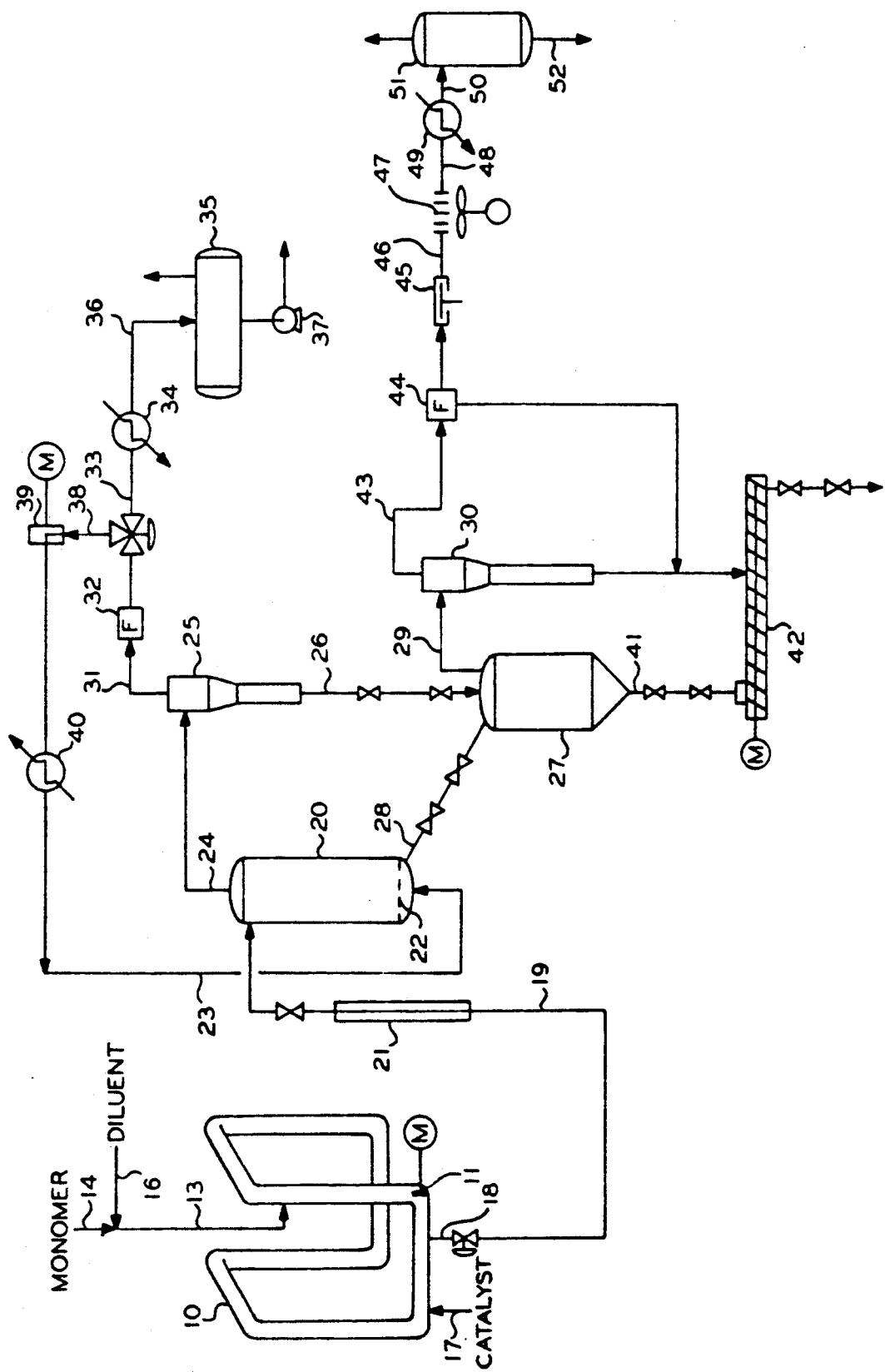

POLYMER RECOVERY PROCESS

This invention relates to a method for recovering solid polymer from a slurry of solid polymer and liquid diluent. In another aspect the present invention relates to the employment of a flash line heater in conjunction with the periodic operation of a settling leg of a loop type continuous type polymerization reactor.

BACKGROUND OF THE INVENTION

In many polymerization processes for the production of normally solid polymer, a stream is formed which is a slurry of particular polymer solid suspended in a liquid medium, ordinarily the reaction diluent. Many of these polymerization processes employ a continuous reactor, such as a loop reactor, having a downwardly depending settling leg wherein polymer accumulates. In such polymerization processes the settling leg is periodically opened and the slurry contain therein is passed on to further processing steps wherein the polymer and diluent are separated. Typically the separation involves the passing of the slurry from the settling leg into a flash tank.

A typical example of such a process is disclosed in U.S. Pat. No. 4,424,341, the disclosure of which is incorporated herein by reference.

As noted in the afore mentioned U.S. Pat. No. 4,424,431, it as been known in the past to employ a flash line heater to supply vaporization heat to the slurry as it is transferred from the settling leg to the flash chamber.

The term flash line heater as used herein refers to an elongated conduit the interior of which is heated indirectly. Generally, most flash line heaters are double pipe heat exchangers. The reaction diluent is vaporized in the inner pipe utilizing the heat supplied from condensing steam in the annulus between the inner and outer pipes. The design of flash line heaters is more complicated than a simple heat exchanger because the flash line operates intermittently, co-transports a multi-phase mixture (solid, liquid, and vapor), and the flow velocity in the line varies over a wide range. One problem in the design and use of flash line heaters is controlling the flow rate in the flash line independent of the polymer slurry discharge rate. Since the flash line should not limit the process flow they have been typically designed to have a flow capacity greatly in excess of what flows from the reactor. Typically only 5 to about 15% of the flow capacity has been used. When a flash line heater is designed in this fashion the low utilization of flow capacity results in a large heat transfer area that is used for a short period of time. An object of the present invention is to provide for a more effective use of the heat transfer capabilities of a flash line heater.

A further object of the present invention is to provide more compact flash line heater systems for polymer recovery.

Still another object of the present invention is to provide for more efficient use of the indirect heat exchange fluid, such as steam.

Other aspects, objects, and advantages of the present invention will be apparent from the following disclosure and FIG. 1.

BRIEF SUMMARY OF THE INVENTION

In accordance with the present invention there is provided a process wherein monomers are polymerized in a liquid diluent to produce a liquid slurry containing particles of normally solid polymers. Periodically the port of a product take off (PTO) valve is opened to allow a charge of the liquid slurry to flow into an elongated confined zone including a flash line heater and then into a flash chamber wherein the lighter components are separated from said particles. The process is characterized by the fact the elongated confined zone is constructed such that the flow time of said charge of slurry in said elongated confined zone is equal to at least about 25% of the time between the closing of the settling leg valve and the next opening of the settling leg valve.

BRIEF DESCRIPTION OF THE DRAWING

FIG. 1 is a schematic diagram illustrating a process for separating polymer from diluent in accordance with the present invention.

DETAILED DESCRIPTION OF THE INVENTION

While the present invention is applicable to any mixture which comprises a slurry of polymer solid and diluent, it is particularly applicable to slurries resulting from olefin polymerizations. The olefin monomers generally employed in such reactions are 1-olefins having up to 8 carbon atoms per molecule and no branching nearer the double bond than the four position. Typical examples include ethylene, propylene, butene-1, 1-pentene, and 1, 3-budiene. The present invention is particularly useful in the polymerization of ethylene with or without the addition of small amounts of other comonomers such as hexene-1 or other monomers which are known to be useful for modifying the density of polyethylene.

Typical diluent employed in such olefin polymerizations include hydrocarbons having 3 to 12, preferably 3 to 8 carbon atoms per molecule, such as propane, propylene, and butane and pentane, isopentane, N-hexane, toluene, isoctane, isobutane, 1-butene, and the like. In some cases, naphthene hydrocarbons having 5 to 6 carbon atoms in the naphthene ring are also used examples of such naphthene hydrocarbons include cyclohexane, cyclopentane, methylcyclopentane, ethylcyclohexane, and the like.

In accordance with the invention the polymerization is conducted at super atmospheric pressure and the polymer solids preferably accumulate in a settling leg. The settling leg is provided with a PTO valve having a port which opens into an elongated confined zone which comprises a flash line heater. The elongated confined zone is in turn connected to a flash tank which exposes the contents of the flash line heater to a reduced pressure.

The polymerization reaction temperature will vary depending upon the particular liquid diluent, the type of catalyst, and the type of olefin reactants. Usually, however polymerization is carried out at a temperature of no more than about 230° F., more generally between about 225° F. and about 140° F.

Due to the fact the PTO valve of the settling leg is only periodically opened the flow of slurry in the flash line is intermittent. The present invention is based upon the discovery that if one restricts the flow in the elongated confined zone, one can obtain equivalent vaporization with smaller diameter shorter flash line heaters.

Generally the elongated confined zone should be constructed such that the flow time a charge of slurry in the elongated confined zone is equal to at least about 25% of the time between the closing of the PTO valve and the next opening of the PTO valve. More preferably the flow time of the slurry in the elongated confined zone is equal to an amount in the range of at least 40 to at least about 70% of the time between the closing of the settling leg valve and the next opening of the settling leg valve.

The restriction of the flow in the elongated confined zone can be accomplished by any suitable means including areas of varying cross section or a area containing an adjustable orifice. If an adjustable orifice is employed the potential for polymer plugging must be taken into account. In a preferred embodiment the restriction is provided solely by the internal cross sectional area of the inner pipe of the flash line heater, most preferably this inner pipe for an internal cross-sectional area which is substantially uniform throughout its length. The section of the elongated confined zone that has choke flow is the last part of the zone for elongated conduit having uniform diameter. The restrictive, choke flow point, can also be at the outlet of a smaller diameter conduit connected to a larger diameter conduit, or it could be a smaller diameter conduit located at any convenient location in said elongated confined zone.

The determination of the flow time of liquid in the flash line heater can be obtained in any suitable manner. One technique involves recording the pressure in the elongated confined zone just after the port of the PTO valve. The equipment for making such a determination is available in the art, an example of which is disclosed in U.S. Pat. No. 4,211,124, the disclosure of which is incorporated herein by reference. The period of slurry flow can be viewed as the time during which the pressure in the elongated confined zone adjacent the settling leg remains above the normal lowest pressure in the flash tank.

Typically the elongated confined zone has a substantially uniform an internal diameter in the range of about 0.5 to about 10.0 inches, more preferably about 0.5 to about 4.0 inches, and still more preferably about 0.75 to about 2.0 inch.

It has further been found that the ratio of the internal cross sectional area of a settling leg to the internal cross sectional area of the product take off port of the settling leg valve, as well as the ratio of the internal cross sectional area of the product take off port of the settling leg valve to the internal cross sectional area of the elongated confined zone can affect the results obtained with such a system.

Generally, it has been found that the ratio of the cross sectional area of the settling leg to the internal cross sectional area of the product take off port should be no greater than about 25. The larger the leg and the smaller the port size, the less turbulance induced in the leg when the PTO valve opens. Low turbulance can lead to build of polymer on the settling leg wall and eventually plugging of the settling leg. In addition as the ratio of the settling leg to the product take off port increases more time is required in order to dump a certain percentage of the settling leg volume.

A PTO to elongated confined zone internal cross-sectional ratio of less than about 0.17 is not recommended because the smaller ratios can lead to plugging of the flash lines. This is believed to be due to the fact that the smaller PTO valve ports do not provide sufficient fluid velocity to transport the solids to the flash tank in effective manner. More preferably the internal cross sectional ratio of the PTO to the elongated confined zone is not less than about 0.25.

Typically the ratio of the internal cross sectional area of the settling leg to the internal cross sectional area of the elongated confined zone is in the range of about 4 to about 25. The term "internal cross-sectional area as used herein refers to the average internal cross-sectional area of the length of the subject item.

The exact heating conditions employed in the flash line heater will vary depending on the particular results desired and the particular polymer and diluent being processed. Generally it is preferred to operate the flash line heater under conditions such that substantially all of the liquid of said slurry is vaporized by the time the material in the flash line heater reaches the flash tank. Often it is desirable to operate the flash line heater so that the effluent from the flash line heater is at a temperature of about 130° F. to about 200° F., more generally 160° F. to 170° F., when the effluent passes into the flash chamber.

The conditions maintained in the flash tank can also vary widely depending upon the results desired, the polymers being employed, and the diluent involved. Sequential flash steps can be employed, however, it is general preferable to employ a single flash step. Typically when a single flash chamber is to be employed the pressure would be in the range of about 1 to about 20 psig.

A further understanding of the present invention wil be provided by referring to FIG. 1 which illustrates a system employing an embodiment of the invention.

In the embodiment illustrated in FIG. 1 a polymerization is carried out in a loop reactor 10. The polymerization mixture is circulated by an agitator 11. Monomer and diluent are introduced through conduits 14 and 16, respectively connected to conduit 13. Catalyst is added through conduit 17. Normally the catalyst is introduced as a suspension in hydrocarbon diluent.

As the polymerization progresses polymer slurry accumulates in the settling leg 18. The settling leg is provided with a valve providing a product takeoff port (PTO) which is connected to a conduit 19 which in turn opens into a flash chamber 20. The conduit 19 includes a surrounding conduit 21 which is provided with a heated fluid which provides indirect heating to the material in conduit 19. The flash chamber 20 can optionally include in its lower end a gas distribution plate 22. In such a case heated diluent vapor provided via conduit 23 can be passed into the flash chamber 20 and through the distributor plate 22 in such a fashion as to cause a fluidized bed of polymers solids to occur in the flash chamber to assist in the drying of the polymer.

Vaporized diluent exits the flash chamber 20 via conduit 24 as further processing as shown in U.S. Pat. No. 4,424,341. Polymer particles are withdrawn from the chamber 20 via line 28. The polymer from line 28 can be further processed using techniques known in the art. For example, it can be passed to a secondary flash chamber 27 and from there to a conveyer dryer 42. One of the advantages of the present invention is that it is capable of raising the temperature of the polymerization effluent to such an extent that the conveyor dryer can be replaced with a simple purge column.

Preferably the conduit 19 is of sufficient length and diameter to permit the transporting fluid to expand by pressure reductions and vaporization so that the mixture obtains a sonic velocity (or acoustic velocity) in at least one point in the conduit system. Preferably the diameter and length are chosen so as to permit the complete vaporization of the diluent prior to the introduction of the slurry into the flash chamber.

The reactor discharge slurry flow can be spread in time by having the flow restricted at the discharge of the elongated confined zone 19 by reaching choke (sonic) flow at some place in the flash line heater. The slurry that is dumped in batch fashion into the elongated confined zone 19 by the settling leg product take off valve (PTO) is held back to vary extents in the initial section of the flash line by back pressure caused by choke flow. The reduced flow rate in the remainder of the flash line heater uses the heat transfer capacity to a much larger extent so that less surface area for heat transfer is needed to accomplish the vaporization of the reactor liquid in the slurry coming from the PTO valve.

The present invention is based in part on a surprising discovery that due to the intermittent operation of the PTO valves a smaller diameter conduit 19 can give higher slurry discharge temperatures than larger diameter conduit of the same length for equal volume of slurry flow. This is surprising since large diameter conduits have more surface area per unit length for heat transfer than smaller diameter conduits. By using smaller diameter conduits which cause sonic (choke) velocity the time of contact of fluid in the flash line heater, i.e. the flow time, is increased and thus allows one to obtain more heat transfer even though the heat transfer area is smaller for the smaller diameter flash lines.

With proper design a flash line heater in accordance with the present invention it may be possible to do away with polymer dryers or at least reduce the utility cost involved with such polymer dryers.

REPRESENTATIVE EXAMPLE

In a process where polyethylene is produced and the slurry of hydrocarbon and polyethylene that is removed from the settling leg needs to be heated to 190° F. by the time it enters the flash chamber, if choke flow is not used the elongated confined zone would need to be 1300 to 1400 feet of 8 inch line. Such an arrangement would use only about 6% of the flash line heater flow and heat transfer. In contrast by using a 2 inch line only 376 feet of line would be needed to provide approximately the same temperature for product entering the flash tank, i.e. about 190° F.

That which is claimed is:

1. A polymerization process comprising polymerizing monomers in a liquid diluent to produce a liquid slurry containing particles of normally solid polymer, periodically opening a product takeoff valve port to allow a charge of said liquid slurry of particles to flow into an elongated confined zone comprising a flash line heater and then into a flash chamber wherein the lighter components are separated from said particles, further characterized by the fact that the elongated confined zone is constructed such that the flow time of said charge of slurry in said elongated confined zone is equal to at least about 25% of the time between the closing of the product takeoff valve and the next opening of the settling leg valve.

2. A polymerization process according to claim 1 wherein the flow time of said charge of slurry in said elongated confined zone is equal to at least about 40% of the time between the closing of the product takeoff valve and the next opening of the product takeoff valve.

3. A polymerization process according to claim 1 wherein the flow time of said charge of slurry in said elongated confined zone is equal to at least about 50% of the time between the closing of the product takeoff valve and the next opening of the product takeoff valve.

4. A polymerization process according to claim 1 wherein the flow time of said charge of slurry in said elongated confined zone is equal to at least about 60% of the time between the closing of the product takeoff valve and the next opening of the product takeoff valve.

5. A polymerization process according to claim 1 wherein the flow time of said charge of slurry in said elongated confined zone is equal to at least about 70% of the time between the closing of the product takeoff valve and the next opening of the product takeoff valve.

6. A polymerization process according to claim 1 wherein the internal diameter of the elongated confined zone is substantially constant and is in the range of about 0.5 to about 4.0 inches.

7. A polymerization process according to claim 1 wherein the internal diameter of the elongated confined zone is substantially constant and is about 2 inches.

8. A polymerization process according to claim 7 wherein the flow time of said charge of slurry in said elongated confined zone is equal to at least about 40% of the time between the closing of the product takeoff valve and the next opening of the product takeoff valve.

9. A polymerization process according to claim 1 wherein the internal diameter of the elongated confined zone is substantially constant and is about 0.75 inch.

10. A polymerization process according to claim 9 wherein the flow time of said charge of slurry in said elongated confined zone is equal to at least about 70% of the time between the closing of the product takeoff valve and the next opening of the product takeoff valve.

11. A polymerization process according to claim 9 wherein the ratio of the internal cross-sectional area of the settling leg to the internal cross-sectional area of the port of the product takeoff valve is no greater than about 25.

12. A polymerization process according to claim 11 wherein the ratio of the internal cross-sectional area of the of the port of the product takeoff valve to the internal cross-sectional area of the elongated confined zone is at least about 0.17.

13. A polymerization process according to claim 7 wherein said product takeoff valve is located at the lower end of a settling leg and the ratio of the internal cross-sectional area of the settling leg to the internal cross-sectional area of the port of the product takeoff valve is no greater than about 25.

14. A polymerization process according to claim 13 wherein the ratio of the internal cross-sectional area of the of the port of the product takeoff valve to the internal cross-sectional area of the elongated confined zone is at least about 0.17.

15. A polymerization process according to claim 1 wherein said product takeoff valve is located at the lower end of a settling leg and the ratio of the internal cross-sectional area of the settling leg to the internal cross-sectional area of the port of the product takeoff valve is no greater than about 25.

16. A polymerization process according to claim 15 wherein the ratio of the internal cross-sectional area of the of the port of the product takeoff valve to the internal cross-sectional area of the elongated confined zone is at least about 0.17.

17. A polymerization process according to claim 1 wherein substantially all of the liquid of said slurry is vaporized within said elongated confined zone.

18. A polymerization process according to claim 1 wherein said polymer consists essentially of polyethylene.

19. A polymerization process according to claim 18 wherein said flash line heater is operated under such conditions as to assure that the effluent from the flash line heater is at a temperature of about 160° to about 170° F. when said effluent passes into the flash chamber.

20. A polymerization process according to claim 19 wherein said product takeoff valve is located at the lower end of a settling leg and the ratio of the internal cross-section of the settling leg to the internal cross-section of the elongated confined zone is in the range of about 4 to about 25.

* * * * *